(No Model.)
W. G. STAPLES.
SCREW HOLDER AND DRIVER.
No. 565,808. Patented Aug. 11, 1896.
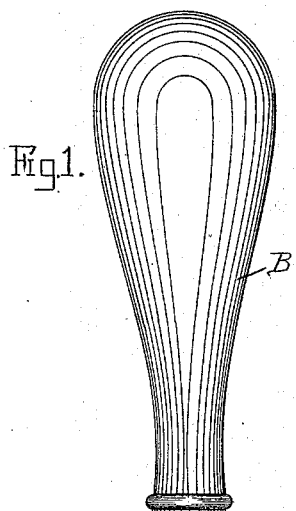
Fig. 1.
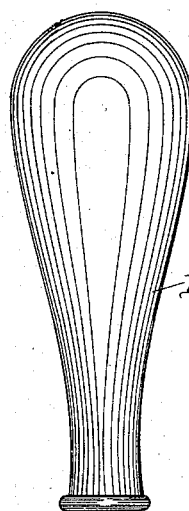
Fig. 2.
Fig. 3.
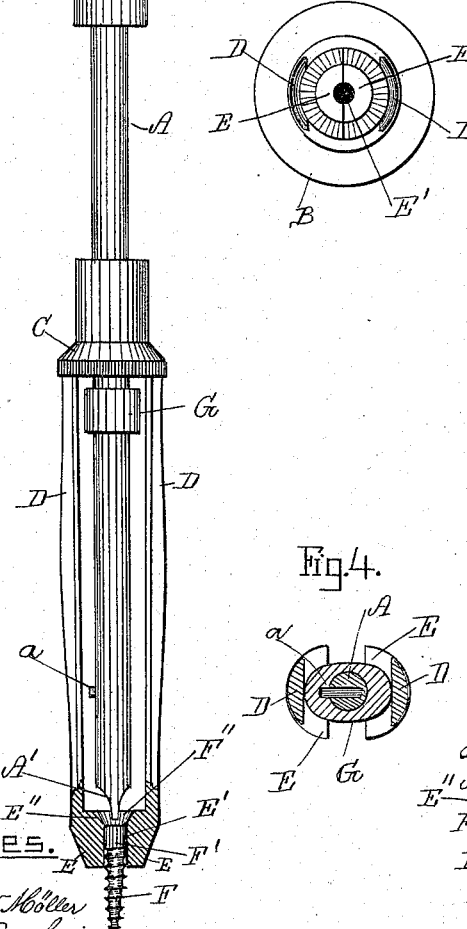
Fig. 4.
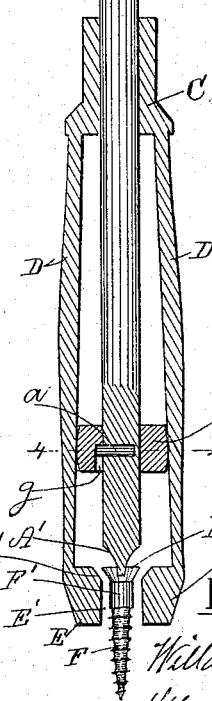
Witnesses.
Lauritz N. Möller
Charles A. Harris
Inventor
Willard G. Staples
by Alban Andrew
his atty.

UNITED STATES PATENT OFFICE.

WILLARD G. STAPLES, OF BROOKFIELD, MASSACHUSETTS, ASSIGNOR OF ONE-HALF TO JOHN H. LEFAVOUR, OF SAME PLACE.

SCREW HOLDER AND DRIVER.

SPECIFICATION forming part of Letters Patent No. 565,808, dated August 11, 1896.

Application filed December 6, 1895. Serial No. 571,222. (No model.)

*To all whom it may concern:*

Be it known that I, WILLARD G. STAPLES, a citizen of the United States, and a resident of East Brookfield, in the county of Worcester and State of Massachusetts, have invented new and useful Improvements in Screw Holders and Drivers, of which the following, taken in connection with the accompanying drawings, is a specification.

This invention relates to improvements in a combined screw holder and driver; and the object of the invention is to hold the screw in attachment with the end of the blade of the screw-driver while placing the screw in position and when screwing it into the desired place without the need of guiding the screw by hand, thus enabling the screw to be screwed into places where it would otherwise be difficult to insert them in the ordinary way without the use of my invention.

The invention is carried out as follows, reference being had to the accompanying drawings, wherein—

Figure 1 represents a side elevation of the improved screw holder and driver, showing the closed jaws in section. Fig. 2 represents a longitudinal section of the same on the line 2 2 in Fig. 1, showing the screw-driver and screw in elevation and showing the jaws expanded. Fig. 3 represents an end view as seen from the lower end of the tool, and Fig. 4 represents a cross-section on the line 4 4 shown in Fig. 2.

Similar letters refer to similar parts wherever they occur on the different parts of the drawings.

In the drawings, A represents the shank of a screw-driver, as usual, having a handle B attached to its upper end.

A' is the lower flattened end of the shank A, as usual.

On the shank A is longitudinally adjustable the sleeve or perforated collar C, to which are attached a series of metal yielding spring-arms D D, to the lower ends of which are secured the segmental screw-holding jaws E E, as shown.

In Fig. 2 F represents a wood-screw having a cylindrical shank F' and conical nicked head F''', as usual.

The expansion-jaws E have a cylindrical central perforation E', adapted to receive the shank F' of the screw F, and have in their upper ends a conical central recess E'', adapted to receive the conical head F'' of the screw F, as shown in Fig. 2.

By making the screw-holding jaws E as shown and described—that is, with a longitudinal cylindrical recess E' to receive the shank of the screw and with a conical upper recess E'' to receive the conical head of the screw—the latter is held and properly centered relative to the axis of the screw-driver shank A during the guiding of said screw to the position desired as well as during the operation of screwing the screw into the desired place.

I have shown in the drawings two spring-arms D D, but more may be used, if so desired, without departing from the essence of my invention.

When screwing the screw "home," it is very desirable to expand the spring-arms D D and to hold them sufficiently expanded to permit the free passage of the screw-head between the jaws, and for this purpose I locate on the shank A, below the sleeve C, a cam G, which is longitudinally movable on said shank, and is normally held by the operator or by its own gravity if the screw-driver is inclined upward in the position shown in Fig. 1. The said cam G is adapted to be locked to the screw-driver shank whenever it is desired to expand the jaws E E and their spring-arms D D, and for this purpose I have shown the shank A as being provided with a side projection $a$, adapted to interlock with a recess $g$ on the under side of the expander-cam G, as shown in Figs. 1, 2, and 4.

In using the device the screw F is inserted within the expansive jaws E, and the sleeve C is moved upward on the shank A sufficiently to cause the lower end of the screw-driver to enter the nick in the head of the screw, as shown in Fig. 1. When the screw has been screwed far enough into the material to cause the jaws E E to abut against said material, said jaws may be separated or expanded, as shown in Fig. 2, in order to permit the screw to enter still farther and to prevent the end of the shank A coming in contact with said jaws. This is accomplished by engaging the cam-expander G with the side projection $a$ by slipping it downward. By thus interlocking the cam-expander G with the shank A and turning the latter and the cam a part of a revolution the spring-arms D D and their jaws E E are caused to be expanded sufficiently to permit the free passage of the screw-head between said jaws, as fully shown in Figs. 2 and 4.

It should be noted that in my invention the cam G is independently movable upon the shank A and may be used to expand the spring-arms D D without affecting the position of the screw-driver with relation to the jaws E. Thus the operator may expand the jaws at will, and if a small or a short screw is to be driven it may be supported and guided by the jaws E E until the point of the screw-driver enters between the said jaws E as far as the operator thinks proper.

In those constructions in which the expanding-cam is a rigid part of the shank of the screw-driver provision must be made for locking the expanding arms and shank so that they will revolve in unison, in order to prevent the cam from expanding the arm prematurely. When the expanding device is a collar rigid on the shank of the screw-driver, the adjustment by which the arms are separated must always cause the point of the screw-driver to project beyond the jaws. By making the cam G adjustable or movable longitudinally upon the shank A, with which it interlocks by engaging the pin $a$, I obtain the advantages mentioned, viz: I dispense with an interlocking connection between the sleeve C and shank or handle and I am able to expand the jaws E E without regard to the position of the point A″ relatively to the jaws.

After the screw has been screwed home and the screw-driver released from the screw, the operator with one hand holds the spring-arms D D and with the other turns the shank A a part of a revolution, causing the expander-cam to be released from the spring-arms and causing the latter to return to their normal positions. (Shown in Fig. 1.)

By making the cam-expander G movable on the shank of the screw-driver and locking it to said shank when at a given point thereon, I provide an extremely simple means for holding the jaws E E expanded as the screw is driven home.

Having thus fully described the nature, construction, and operation of my invention, I wish to secure by Letters Patent and claim—

The combination with a screw-driver of a sleeve capable of longitudinal and rotary movement upon the shank of the screw-driver, said sleeve being provided with spring-arms having jaws to hold and guide the screw, and an expanding-cam movable on said shank and having a recess to engage a side projection whereby it is compelled to turn with the shank, substantially as described.

In testimony whereof I have signed my name to this specification, in the presence of two subscribing witnesses, on this 25th day of November, A. D. 1895.

WILLARD G. STAPLES.

Witnesses:
 WILLIAM F. BAILEY,
 JOHN D. COLE.